United States Patent [19]
Didycz et al.

[11] 3,854,522
[45] Dec. 17, 1974

[54] HIGH SERVICE TEMPERATURE PRESSURE SENSITIVE DEVICE

[75] Inventors: William J. Didycz, Whitehall Borough; Almon D. Seabury, Hampton Twp., Allegheny County, both of Pa.

[73] Assignee: United States Steel Corporation, Pittsburgh, Pa.

[22] Filed: Apr. 25, 1973

[21] Appl. No.: 354,609

Related U.S. Application Data

[62] Division of Ser. No. 133,938, April 14, 1971, Pat. No. 3,780,793.

[52] U.S. Cl. ............... 165/1, 137/68, 137/797, 165/53, 220/27, 220/89 A
[51] Int. Cl. .......................................... F24h 13/00
[58] Field of Search ............ 137/68, 340, 334, 797, 137/69, 71; 220/89 A, 44 C, 44 R, 27; 176/38, 87; 165/1, 138, 47, 53

[56] References Cited
UNITED STATES PATENTS

| | | |
|---|---|---|
| 2,309,856 | 2/1943 | Mason ............................ 220/89 A |
| 3,207,671 | 9/1965 | Kornbichler ......................... 176/38 |
| 3,330,334 | 7/1967 | Jansen et al. ........................ 165/47 |
| 3,499,462 | 3/1970 | Berczynski .......................... 137/340 |
| 3,583,479 | 6/1971 | Taylor et al. ..................... 137/68 X |

Primary Examiner—Albert W. Davis, Jr.
Assistant Examiner—S. J. Richter
Attorney, Agent, or Firm—David S. Urey

[57] ABSTRACT

Rupture discs are combined with cooling means to provide high service temperature pressure sensitive devices.

3 Claims, 3 Drawing Figures

PATENTED DEC 17 1974 3,854,522

HIGH SERVICE TEMPERATURE PRESSURE SENSITIVE DEVICE

This application is a divisional application of U.S. Patent Application Ser. No. 133,938 filed Apr. 14, 1971, now U.S. Pat. No. 3,780,793, granted on Dec. 25, 1973 and assigned to the assignee of the present application.

BACKGROUND OF THE INVENTION

Many pressure servicing requirements for vessels are handled by devices known as rupture discs which have as their primary element a membrane that will burst within a small range of a specified pressure and so prevent over-pressure in the vessel. Usually, the rupture disc, covering an opening in the vessel, is held between flanges.

A rupture disc has fewer moving parts than other pressure releasing devices such as safety valves. The outstanding characteristics of rupture discs are fast action and large capacity. The absence of a valving mechanism or seat also makes them particularly advantageous for sticky or gummy materials.

There are two basic classes of rupture discs — metallic and non-metallic. Metallic discs can be made from a variety of materials such as aluminum, copper, stainless steel, etc. Special corrosion-resistant applications might require lining the disc with fluorocarbons or fluorohalocarbons. To obtain economical disc life, it is imperative that the rupture disc not be exposed to very high temperatures since all pre-formed disc materials have a reduction in strength when exposed to an elevated temperature. There are elevated temperature limitations beyond which the various materials are not recommended for use in rupture discs. For example, aluminum is not recommended for use at temperatures over approximately 250°F. By using special alloys such as Inconel or by the use of a composite disc of two or more metals, the service temperature of the discs may be increased to approximately 1,000°F. However, operating the rupture disc at such high temperatures increases the tendency toward metal creep and necessitates a somewhat wider margin between operating and rupture pressures than necessary at lower temperatures in order to achieve maximum service life.

Thus, there exists a need for a high service temperature (over 1,000°F) pressure sensitive device providing the advantages associated with rupture discs. It is one object of this invention to provide such a device.

SUMMARY OF THE INVENTION

Accordingly, we have now found that by combining an ordinary rupture disc with a cooling means for flowing a cooling liquid across the outer surface of the rupture disc, we can increase the service temperature of the disc to over 1,000°F. In the high service temperature pressure sensitive device of our invention (a rupture disc), a low service temperature pressure sensitive device (less than 500°F) is combined with a cooling liquid means disposed adjacent to the rupture disc for directing a cooling liquid on the rupture disc. We thereby obtain the advantages of using rupture discs in environments where the temperature far exceeds the service temperature of the rupture disc.

DETAILED DESCRIPTION

Figure 1:
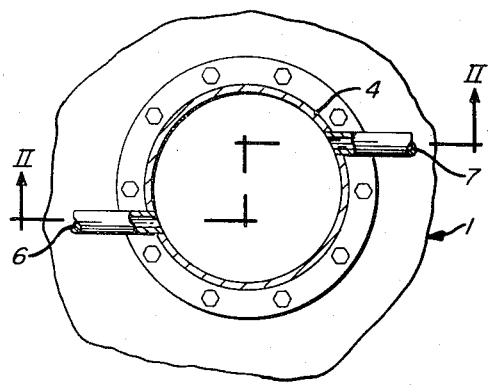
FIG. 1 is a top view of our device mounted on a pressure vessel.
Figure 2:
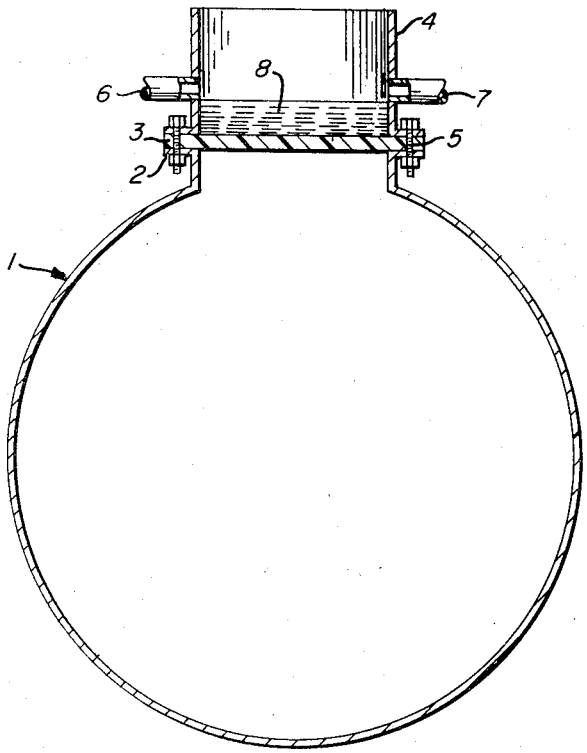
FIG. 2 is a cross-sectional view of our device mounted on a pressure vessel taken along the line II—II of FIG. 1 in the direction of the arrows.
Figure 3:
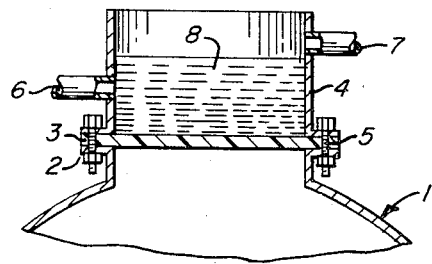
FIG. 3 is a vertical sectional view of the means as shown in FIG. 1 of the complete cooling means taken along a line similar to line II—II of FIG. 1 in the direction of the arrows and showing a larger amount of cooling fluid than in FIG. 2.

Referring to FIGS. 2 and 3, the pressure vessel 1 (FIGS. 1, 2) has a flanged opening 2 on its upper surface. A rupture disc 3 (FIGS. 1-3) is mounted over the opening 2. A container 4 (FIGS. 1-3) for liquids is mounted over the rupture disc 3. The container 4 for liquids and the rupture disc 3 are secured to the flanged opening 2 in the wall of the pressure vessel 1 by means of bolts 5. An inlet port 6, for the entry of cooling liquid, and an outlet port 7, for the exit of cooling liquid, are provided in the wall of the container 4 for liquids, for the entry and exit of cooling liquid 8.

In FIG. 3, a cross sectional view of a preferred embodiment of our invention is depicted. An inlet port 6, for the entry of cooling liquid 8, is provided in the wall of the container 4 for liquid, at a point relatively near the bottom of said container 4 for liquids. An exit port 7, for the exit of cooling liquid 8, is provided in the wall of the container for liquids, at a point relatively near the top of said container 4 for liquids.

Our high service temperature pressure sensitive device is composed of 1) a rupture disc 3, and 2) a cooling liquid means. The rupture disc 3 is fastened over an opening in a wall of a pressure vessel 1 and the cooling liquid 8 is maintained on the outer surface of the rupture disc 3. The rupture disc 3 may be made of any conventional material, for example, chromium, copper, silver, nickel, Monel, Inconel or 347 or 316 stainless steel. Non-metallic rupture discs may also be used, as for example, discs fabricated of thermoplastic materials such as polystyrenes, polyfluorocarbons, nylons, acetals, polycarbonates, etc. or of other non-metallic materials. The rupture disc 3 may be composed of a single material or it may be a laminate. Recommended maximum service temperature for rupture discs 3 of these materials varies widely but is 250°F or below except for nickel, Monel, Inconel or 347 or 316 stainless steels which have service temperatures of up to 400°F. As these temperatures are approached or exceeded, the tendency toward metal creep is increased and a reduction in strength occurs. Thus, rupture discs 3 which are recommended for use at for example, 75 percent of rupture pressure at ambient temperature, are recommended for use at only about 50 percent or less of rupture pressure at higher temperatures. As an example of the lowering of rupture pressure with temperature, a stainless steel rupture disc having a rupture pressure of 500 psig at 72°F has a rupture pressure of about 425 psig at 200°F, about 355 psig at 400°F and about 340 psig at 600°F. Also, the service life of the discs 3 decreases rapidly as the upper limit of recommended service temperature is approached or exceeded.

Our invention, by applying liquid cooling means to the outer surface of the disc 3, allows the use of rupture discs 3 in environments far exceeding their usual service temperature while retaining the disc strength and long service life. The liquid cooling means maintains the temperature of the disc 3 far below that of its environment. In consequence, corrosive materials present in gaseous form in the atmosphere of the pressure vessel 1 very often condense on the inner face of the rupture disc 3. To preclude corrosion of the rupture disc 3, we have found it highly advantageous to coat the inner surface and preferably both surfaces of the disc 3 with a corrosion retarding substance, of which solid polyfluorocarbons such as Teflon (a registered trade mark of du Pont) and polyfluorohalocarbons are preferred examples.

The rupture disc 3 is attached to the wall of the pressure vessel 1 in a pressure tight relationship. We have found that mounting the rupture disc 3 by means of bolts and gaskets is a simple, convenient and useful method; however, other mounting means may also be used.

The type of pressure vessel 1 on which our high service temperature pressure sensitive device may be used may vary widely. Our devices have primary application where the environment within the pressure vessel 1 is above the service temperature of ordinary rupture discs 3. Thus, we would contemplate use of our devices in incinerators, autoclaves and chemical process reactors. These examples are non-limiting however as the devices of our invention may be used in any pressure vessel 1 wherein the pressure is within the pressure range of available rupture discs 3. The temperature environment of the pressure vessel 1 is not a limiting factor, as, by choice of appropriate cooling liquid and/or flow rate, our devices may accommodate any environment. It is contemplated that matter contacting the inner face of the rupture disc 3 would be at least partially in the gaseous state, although in some instances the inner face of the disc 3 could be immersed in a liquid. Problems involving heat transfer could arise, as could interference with chemical reactions taking place in the pressure vessel 1, were the disc 3 completely immersed in a liquid in the pressure vessel 1.

Liquid Cooling Means

The liquid cooling means comprises a liquid delivery means 6 and a means for maintaining the liquid 8 in contact with the outer surface of the rupture disc 3. In a preferred embodiment of our invention, the delivery means is a pipe 6 and the means for maintaining the liquid in contact with the disc is a cylinder 4 mounted over the rupture disc 3. The means for maintaining the liquid in contact with the disc may be any type of vented container 4. Ports 6, 7 may be provided in the walls of the container 4 for the entry of cool and exit of hot liquid 8, or the liquid 8 may merely be allowed to overflow the top of the container 4.

The cooling liquid 8 may be any liquid which is inert in the environment in which it is to be used. Any of the common cooling liquids, such as water, silicone and petroleum oils, glycols, such as ethylene glycol, etc., may be used. Water is the cooling liquid of choice in most applications because of its cheapness and safety.

The cooling liquid 8 may be recirculated after heat exchange to cool it, used until it becomes hot and then disposed of, or it may be maintained over the disc 3 and allowed to boil away, care being taken to replenish the liquid 8 so that a body of liquid 8 is always maintained over the disc 3.

The depth of the pool of cooling liquid 8 may vary within wide limits but should not be so deep as to exert a high opposing pressure on the rupture disc 3. For most applications, we have found that a depth of up to about 2 feet of liquid 8 is suitable and that a depth of about 2 to 8 inches is preferable. The depth of the liquid 8 could be greater than 2 feet but no new benefits are obtained by such an increase in depth and the time delay is thereby increased.

If the cooling liquid 8 is allowed to boil, care must be taken that the boiling point of the cooling liquid 8 is within the range of the ordinary service temperature of the rupture disc 3. We prefer continuously to add cool liquid to the pool 8 over the rupture disc 3 and to continuously withdraw hot liquid from the pool 8. By varying the rate of addition of cool liquid 8 and withdrawal of hot liquid 8, it is possible to obtain a temperature rise of not more than 5° or 10°F. Where it is most advantageous to use a small liquid flow, the temperature may be allowed to rise 75° or 100°F or more up to either the boiling point of the liquid 8 or the upper limit of the service temperature of the disc 3. Where cooling liquid 8 is plentiful and cheap, a greater liquid flow rate may limit the temperature rise to only a few degrees above ambient.

Our invention is further illustrated by the following non-limiting examples.

Example I

A high service temperature pressure sensitive device of our invention was mounted on an incinerator 1 used to dispose of the waste gas from a phthalic anhydride plant. The incinerator operated at a temperature of 1,350°F and a pressure of 0.67 psig. A rupture disc 3 rated at 2 lb. ± 0.3 psig and having a Teflon (trade mark) coating on its inner surface was secured to a 30 inch diameter carbon steel cylinder 4 having ports 6, 7 in its wall for the entry and exit of cooling liquid 8 and a flange on its lower edge. The device was mounted over a flanged opening 2 of 30 inch diameter in the top of the incinerator 1 and secured by means of 10¾ inch diameter bolts 5. The cylinder 4 was filled to a depth of 6 inches with water at a temperature of 60°F. The flow rate of water to the cylinder 4 was 11 gallon/minute. The temperature of the water was checked intermittently and was found to have reached, at equilibrium, a temperature of 70°F. At the end of three months, the device was still in operation.

Example II

Procedure and materials as in Example I except that flow rate of water to the cylinder 4 was one-half gallon/minute. Water temperature reached, at equilibrium, 180°F.

We claim:

1. A method of increasing the service temperature of vented rupture discs comprising maintaining a body of cooling liquid on the outer surface of said vented rupture disc.

2. A method of increasing the service temperature of vented rupture discs comprising flowing a cooling liquid across the outer surface of said vented rupture disc.

3. The method of claim 2 wherein the cooling liquid is water.

* * * * *